United States Patent [19]

Meijer

[11] Patent Number: 4,615,261
[45] Date of Patent: Oct. 7, 1986

[54] STIRLING ENGINE WITH IMPROVED PISTON RING ASSEMBLY

[75] Inventor: Roelf J. Meijer, Ann Arbor, Mich.

[73] Assignee: Stirling Thermal Motors, Inc., Ann Arbor, Mich.

[21] Appl. No.: 665,700

[22] Filed: Oct. 29, 1984

[51] Int. Cl.⁴ .................................................. F16J 9/02
[52] U.S. Cl. ........................................ 92/200; 277/26; 277/27; 277/165; 277/194
[58] Field of Search ............... 92/1, 193, 198, 200, 92/248; 277/26, 27, 165, 194

[56] References Cited

U.S. PATENT DOCUMENTS

| 1,761,808 | 6/1930 | Weaver | 277/26 |
| 2,857,184 | 10/1958 | Mancusi | 277/165 |
| 4,132,417 | 1/1979 | Lagerqvist | 277/194 X |

FOREIGN PATENT DOCUMENTS 1804869  5/1970  Fed. Rep. of Germany ........ 277/26

Primary Examiner—Gerald A. Michalsky
Attorney, Agent, or Firm—Stephenson and Boller

[57] ABSTRACT

An improved piston ring assembly, particularly for a Stirling engine, comprises a piston ring made from a TFE fluorocarbon such as Rulon which is disposed in a piston ring groove and is acted upon by an annular bi-metal element disposed between the groove and the ring. When the engine is cold, the bi-metal element urges the ring outwardly so that a flat radially outer surface of the ring is forced into face-to-face contact with the cylinder wall. When the engine has warmed up, the force of the element of the piston ring is relaxed and the thermal expansion of the piston ring maintains the outer surface of the ring in face-to-face contact with the cylinder wall.

8 Claims, 4 Drawing Figures

STIRLING ENGINE WITH IMPROVED PISTON RING ASSEMBLY

BACKGROUND AND SUMMARY OF THE INVENTION

This invention relates generally to engines having pistons reciprocating within cylinders, and particularly it relates to an improved piston ring assembly between a piston and a cylinder wall. The invention is especially useful in a Stirling engine.

It is known to use a piston ring for sealing between a reciprocating piston and the wall of a cylinder in which the piston reciprocates. It is important for the piston ring to exhibit an effective sealing action, but not at the expense of any significant impairment of the engine operating efficiency because of frictional losses resulting from the action of the piston ring on the cylinder wall as the piston reciprocates.

In Stirling engines, it is known to use piston rings made of certain materials which can operate without lubrication, examples of which are certain compounds of TFE fluorocarbons, such as Rulon. These materials have high coefficiencies of friction, and therefore while they can contribute toward sealing effectiveness of unlubricated piston rings, they do so at the expense of creating significant mechanical losses as the pistons reciprocate in the cylinders.

The piston rings of the known art are not closed but rather slotted or cut radially so that they form an open circle. The slot gives rise to some leakage and thus impairs the sealing function of the piston ring to a certain degree.

Prior efforts to improve the sealing effectiveness of the piston ring have involved the elimination of the slot and hence the use of a closed piston ring. These efforts have not been successful because a closed piston ring is subjected to thermal effects which give rise to expansion and contraction of the ring which causes it, upon shut-down of the engine, to lose contact with the cylinder wall. Thus upon subsequent start-up of the engine, sealing cannot be established. Further attempts to provide the reestablishment of sealing upon start-up have always given rise to increased friction losses during operation.

The present invention relates to an improvement in a piston ring assembly, particularly for a Stirling engine, which permits the use of an unslotted, closed ring which provides satisfactory sealing during operation, yet the invention prevents the loss of sealing effectiveness at starting without increasing the frictional losses during running.

The invention comprises the further attribute of eliminating most of the frictional loss during running and is accomplished in part through an advantageous construction and arrangement of the cross sectional shape of the closed piston ring and of the piston ring groove within which the piston ring is disposed. The design of the ring and groove are such that during running the average pressures on the outward and the inward axial faces of the ring are approximately the same and thus the force acting radially outward on the ring, and hence the friction, is minimal. During starting, when the engine is cold, a radially outwardly directed force acts on the ring forcing it into contact with the cylinder wall, thus establishing sealing. This force is relieved when the engine has warmed up so that it does not give rise to frictional losses. For the attainment of such mode of operation a temperature responsive element is disposed in the piston ring groove for coaction with the piston ring. When the engine is being started, the temperature responsive element, which may be in the form of a bi-metal annulus, is effective to exert a radially outward force around the circumference of the piston ring. This causes a flat radially outwardly facing outer surface of the piston ring to be urged flat against the cylinder wall in face-to-face contact. This condition ensues as the engine warms up.

When a certain temperature is reached, the bi-metal element has circumferentially contracted to relax the radially outwardly directed force on the piston ring.

A seal is provided between the piston ring and the piston ring groove to prevent leakage between the piston ring and the piston itself, and thus to eliminate any net mass transfer between opposite sides of the piston.

In order to facilitate communication of the pressure conditions acting on opposite axial faces of the piston to the piston ring, one or more radial grooves may be provided in selected locations on the piston ring.

The disclosed embodiment of the improved piston ring assembly comprises an annular piston ring having what may be considered as an L-shaped cross section consisting of an axial leg and a radial leg. The piston ring groove has a similar L-shaped cross section. In the disclosed embodiment the temperature responsive means takes the form of a bi-metal ring which is disposed within the piston ring groove to be effective on the radial leg of the piston ring. Radial grooves provided on the axial faces of the piston ring or the piston ring groove permit pressures from opposite sides of the piston ring within the piston ring groove to balance the pressure force acting on the sealing face of the piston ring. In order to prevent leakage between the two pressures thus communicated, a circular seal is provided between the groove and the piston ring. This seal is located in its own groove which is open to the piston ring groove. In the disclosed embodiment, this circular seal is in sealing contact with the radial leg of the piston ring.

Other advantageous features of the invention will be seen in the ensuing description of a presently preferred embodiment of the invention. The disclosure includes several drawing figures wherein like components are identified by like reference numerals.

DESCRIPTION OF THE PREFERRED EMBODIMENT

Figure 1:
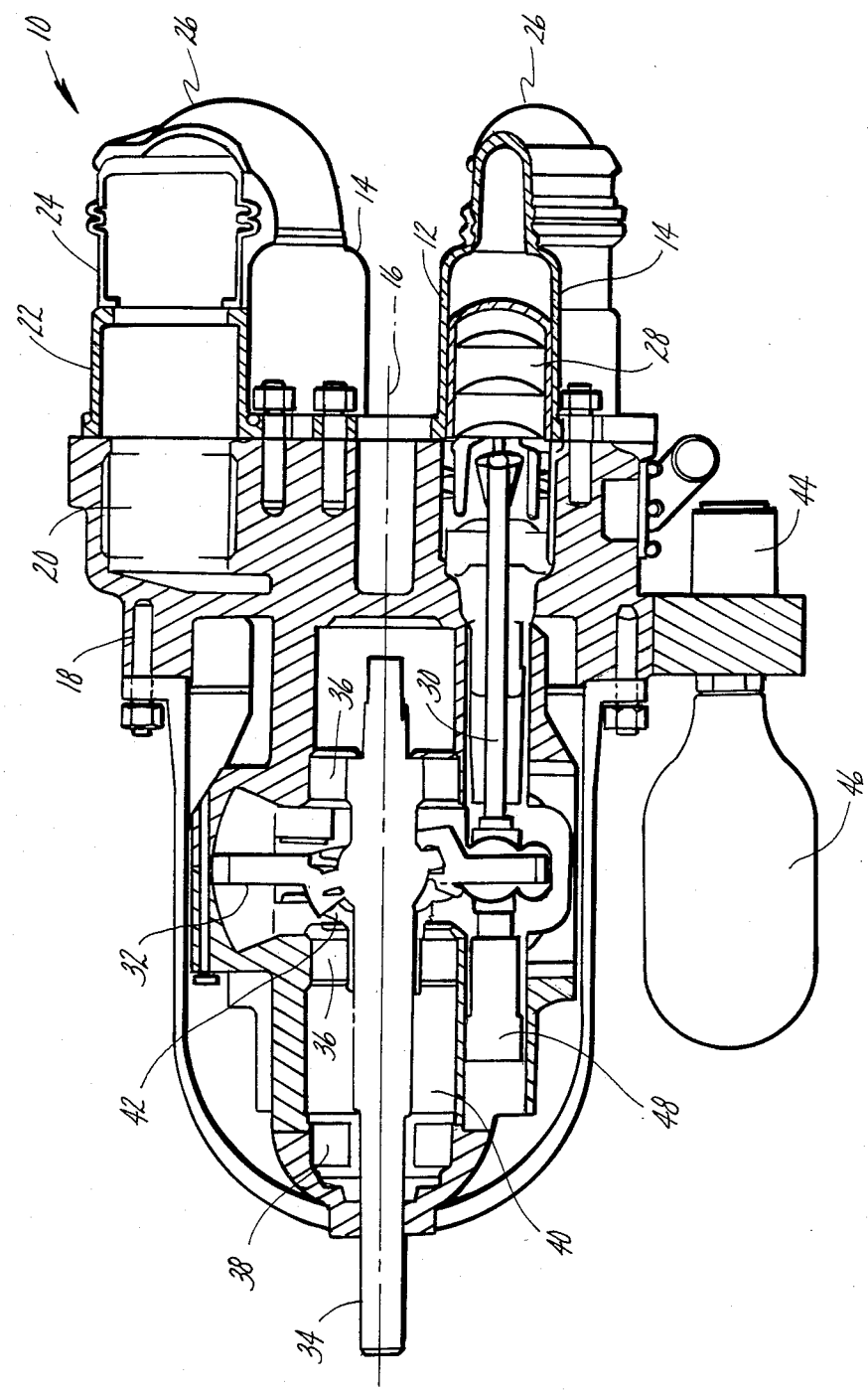
FIG. 1 is a longitudinal cross sectional view through an example of a Stirling engine containing improved piston ring assemblies according to the present invention.

An example of a Stirling engine 10, containing a piston ring assembly 12 is shown in FIG. 1. Engine 10 is like that shown in applicant's allowed U.S. Pat. application Ser. No. 405,749 filed Aug. 6, 1982, now U.S. Pat. No. 4,481,771. More particularly, engine 10 contains four substantially parallel cylinders 14 disposed in a square cluster about a central axis 16 within a drive mechanism housing 18. Associated with each cylinder 14 and located on an end surface of drive mechanism housing 18 is a heat exchanger combination comprising a cooler 20, a regenerator 22, and a flexible heat exchanger 24 located in a substantially parallel orientation with respect to each cylinder. A short rigid hot connecting duct 26 connects a cylinder 14 to a flexible heat exchanger 24, hot connecting duct 26 and cylinder 14 from a separate apparatus while each cooler 20 is located within drive mechanism housing 18.

Located within each cylinder 14 is a reciprocating piston 28 and a connecting rod 30 rigidly affixed thereto. A swashplate 32 converts the reciprocating axial motion of each piston 28 to rotary motion of an output shaft 34 which is journaled by main bearings 36 and a thrust bearing 38. The angle of swashplate 32 is variable over an angular range, for example from 0° to 22°, by rotating swashplate 32 relative to a tilted section of output shaft 34 to vary the power output of the engine. This rotation is effected by a hydraulic stroke converter 40 and transmitted to swashplate 32, by a bevel gear 42. As the angle of swashplate 32 increases, the piston stroke also increases causing engine power output to increase due to such increased stroke and the increase in ratio of volume swept by the pistons to total volume of engine working fluid.

Hydraulic fluid is supplied to and returned from stroke converter 40 by concentric tunnels (not shown) in output shaft 34. Fluid supply and return is controlled by power control valve 44 and an adjacent accumulator 46. A crosshead 48 slidably connects each piston connecting rod 30 to swashplate 32.

In operation, differential pressure is applied to opposite sides of each piston in accordance with the operating cycle, and the engine converts a portion of the energy input into useful work at the output shaft. In order to efficiently operate the engine, sealing of each piston to the wall of the cylinder within which it reciprocates is important. Accordingly, it has been known to use a piston ring seal to resist leakage of fluid from one axial side of the piston to the opposite side. However, the objective of providing an adequate seal can be inconsistent with the objective of efficiently operating the engine where the effectiveness of the seal depends upon a forceful engagement of the piston ring with the axial wall of the cylinder.

The present invention is directed to an improvement in the piston ring for maintaining forceful sealing effectiveness under certain conditions of operation, but relaxing the force under other conditions of operation so that under these other conditions of operation the effectiveness of the seal is maintained but with noticeably less impairment of the engine's efficiency than if the force were not relaxed.

Figure 2:
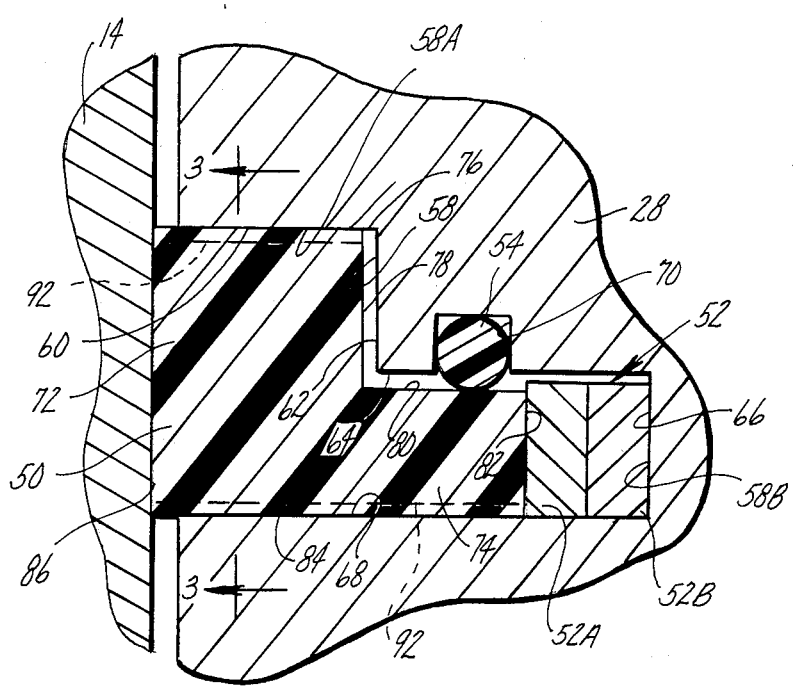
FIG. 2 is an enlarged fragmentary cross sectional view taken radially through a piston ring assembly according to the present invention and illustrating the piston ring in sealing contact with the wall of the cylinder within which the piston reciprocates. The proportions are not necessarily to scale so that clarity in the illustration is obtained.
Figure 3:
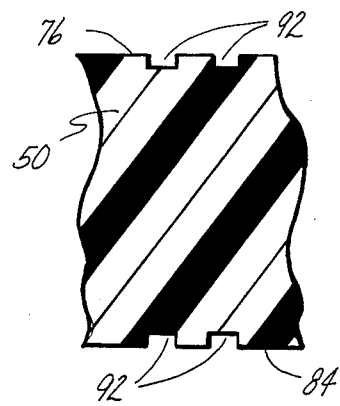
FIG. 3 is a fragmentary cross sectional view taken generally in the direction of arrows 3—3 FIG. 2.
Figure 4:
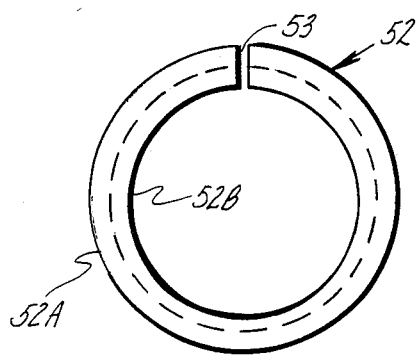
FIG. 4 is an axial view of one of the parts of the assembly of FIG. 2 shown by itself on a reduced scale.

FIGS. 2, 3, and 4 show detail of a piston ring assembly 12. Piston ring assembly 12 comprises a piston ring 50, a temperature responsive element 52, and a seal 54. These parts are disposed within the piston ring groove which is identified by the general reference numeral 58. The piston ring groove 58 may be considered to have a general L-shaped cross section comprising two axially adjoining parts 58A and 58B with the part 58B being radially deeper than the part 58A. The axial dimensions of the two parts 58A and 58B are, however, approximately the same. The piston ring 50 is of continuous, unbroken annular shape but the element 52 is of noncontinuous shape having a gap 53 between its ends as shown in FIG. 4.

The part 58A comprises an axially facing radial wall 60 and a radially outwardly facing axial wall 62.

The part 58B comprises an axially facing radial wall 64, a radially outwardly facing axial wall 66, and an axially facing radial wall 68. The walls 60, 62, 64, 66 and 68 define the general L-shaped cross section with the axial walls being perpendicular to the radial walls. All walls of course are circular in shape extending around the piston concentric with the piston axis.

A small circular groove of generally rectangular cross section 70 is provided in wall 64 for seal 54. The dimensions are such that seal 54 fits in a sealing relationship within groove 70 with the seal projecting into sealing engagement with piston ring 50.

Piston ring 50 has a general L-shaped cross section similar to the L-shaped cross section of the piston ring groove 58. It may be considered as comprising an axial leg 72 and a radial leg 74. The axial leg 72 is arranged with respective radial and axial surfaces 76 and 78 in juxtaposition to walls 60 and 62 of the piston ring groove 58. The radial leg 74 comprises a radial surface 80, an axial surface 82, and a radial surface 84. Surface 80 is in juxtaposition to wall 64, and surface 84 to wall 68. The axial dimensions of the surface 78 and the surface 82 are approximately equal. The radial dimension of leg 74 is noticeably less than that of groove part 58B to leave a space which is occupied by element 52. Element 52 is disposed between the radially facing wall 66 of the piston ring groove and the radially inwardly facing surface 82 of the piston ring.

It will be observed in FIG. 2 that radial grooves 92 are provided in the axial faces 76 and 84 of piston ring 50.

Element 52 is composed of two metals having dissimilar coefficients of expansion. One material forms the radially outer part and is designated by the reference numeral 52A while the inner part formed by the other material is designated by the reference numeral 52B.

With the engine cold, the assembly assumes a condition wherein the forces created by element 52 due to the cold temperature condition are effective to cause it to exert radially outwardly directed force around the circumference of piston ring 50 by action against surface 82. When the engine temperature increases to that which would occur in a warmed-up engine, the characteristics of element 52 are such that this force is relaxed.

In the cold engine condition, the element 52 is effective to cause a flat circular radially outwardly facing axial surface 86 of piston ring 50 to be forcefully urged into face-to-face contact with the axial wall surface of cylinder 14. When the engine is operated, a pressure differential exists across the opposite axial faces of the piston. The face-to-face contact between surface 86 and the cylinder wall surface provides an effective sealing action at that time. Because of the radial grooves 92 in the surfaces 76 and 84 of the piston ring 50, the pressure from opposite sides of the piston can act upon the surfaces of the piston ring within the groove. Seal 54 is effective to prevent leakage via this route. Due to the equality of the axial dimensions of surfaces 78 and 82 the radially outward force due to pressure acting on surfaces 78 and 82 is approximately equal in magnitude to the radially inward force due to pressure acting on surface 86 of piston ring 50. These pressure forces thus cancel each other but the effect of the force exerted by element 52 is such that the face-to-face contact of surface 86 with the cylinder wall is maintained as the cold engine is started and during the initial warm-up phase of engine operation.

As the engine heats up the bi-metal element 52 relaxes the radially outward force which it is exerting on the piston ring 50 while at the same time the piston ring 50 undergoes a radial thermal expansion. At a certain temperature of operation corresponding to the engine having warmed up, the radial expansion of the piston ring 50 is sufficient to maintain the surface 86 in face-to-face contact with the cylinder wall without the help of element 52 which at that temperature has relaxed most of the force which it exerts on the piston ring so that it does not give rise to unnecessary frictional loss.

While a preferred embodiment of the invention has been illustrated, those skilled in the art will perceive that the invention may be embodied in forms other than the specific form which has been illustrated. For example, the temperature responsive element 52 is disclosed in the form of an annular body having an outer part 52A formed of a metal alloy having a higher coefficient of expansion than the inner part 52B, but a multi-convolution spiral could also be used for the temperature responsive element 52. While the preferred material for ring 50 is Rulon, other material may be suitable.

What is claimed is:

1. In an engine having a reciprocating piston axially stroking within a walled cylinder by a pressure differential acting on opposite axial sides of the piston and an annular piston ring disposed in an annular piston ring groove around the piston for sealing between the piston and the wall of the cylinder to resist leakage past the piston, the improvement characterized in that the piston ring is endowed with a flat radially outwardly facing annular axial surface confronting the cylinder wall, temperature responsive means arranged within the groove for coaction with the piston ring to forcefully urge the piston ring radially outwardly when the engine is cold such that said flat radially outwardly facing annular axial surface of the piston ring is urged flat against the cylinder wall but to relax from urging the piston ring outwardly when the engine becomes warm, said piston ring groove having two contiguous axial portions one of which extends radially deeper into the piston than the other, said piston ring being of generally L-shape in cross section so that it has two leg portions consisting of a radially extending leg portion and an axially extending leg portion, said radially extending leg portion being disposed in cooperative association with the one axial portion of the groove and the axially extending leg portion being disposed in cooperative association with the other axial portion of the groove, said temperature responsive means being disposed within said one axial portion of the piston ring groove to be coactive on said radially extending leg portion of the piston ring, and annular sealing means disposed within said groove for sealing between said piston ring and piston to resist leakage between said piston ring and piston.

2. The improvement set forth in claim 1 in which said temperature responsive means comprises a bi-metal element coacting with said piston ring.

3. The improvement set forth in claim 1 in which said annular sealing means comprises an annular O-ring seal of circular cross section disposed in its own groove which is open to said piston ring groove, and said O-ring seal protrudes from its own groove into sealing contact with said piston ring.

4. The improvement set forth in claim 3 in which said O-ring seal is disposed in sealing contact with an axially facing radial surface of the piston ring.

5. The improvement set forth in claim 1 in which said annular sealing means is disposed to seal against said radially extending leg portion of the piston ring.

6. The improvement set forth in claim 5 in which said annular sealing means is disposed to act in a sealing manner between axially confronting radial surfaces of the piston ring and piston ring groove.

7. In an engine having a reciprocating piston axially stroking within a walled cylinder by a pressure differential acting on opposite axial sides of the piston and an annular piston ring disposed in an annular piston ring groove around the piston for sealing between the piston and the wall of the cylinder to resist leakage past the piston, the improvement characterized in that the piston ring is endowed with a flat radially outwardly facing continuous annular axial surface of predetermined length confronting the cylinder wall, said groove and piston ring being arranged with a relative fit which allows the piston ring to expand slightly within the groove in opposite senses and thereby cause said flat radially outwardly facing annular axial surface of the piston ring to be engaged flat against the cylinder wall, said piston ring groove having two contiguous axial portions one of which extends radially deeper into the piston than the other, said piston ring is of generally L-shape in cross section so that it has two leg portions consisting of a radially extending leg portion and an axially extending leg portion, said radially extending leg portion being disposed in cooperative association with the one axial portion of the groove and the axially extending leg portion being disposed in cooperative association with the other axial portion of the groove, each of said leg portions having a radially inwardly facing axial surface of an axial length substantially one half said predetermined length, annular sealing means disposed within said groove for sealing between said piston ring and piston to resist leakage between said piston ring and piston, said annular sealing means comprising an annular O-ring seal of circular cross section disposed in its own groove which is open to said piston ring groove, said O-ring seal protruding from its own groove into sealing contact with said piston ring, and means in the piston ring providing for communication of pressure acting on the piston to said inwardly facing axial surfaces, whereby the pressure forces on the inwardly facing and outwardly facing axial surfaces of said piston ring cancel each other.

8. The piston ring assembly according to claim 7 further including generally ring shape temperature responsive means in said piston ring groove operable to apply a force on said piston ring urging the piston ring radially outwardly against the cylinder wall when the engine is cold and to discontinue said force when the engine becomes warm.

* * * * *